Feb. 10, 1948.  R. T. NORTHCUTT ET AL  2,435,842
PREPARATION OF DRIED FRUIT PRODUCTS
Filed July 2, 1942
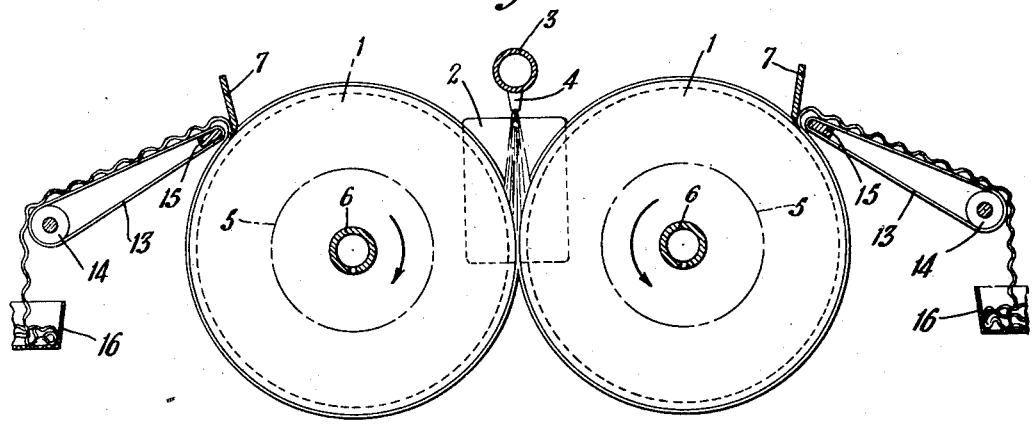
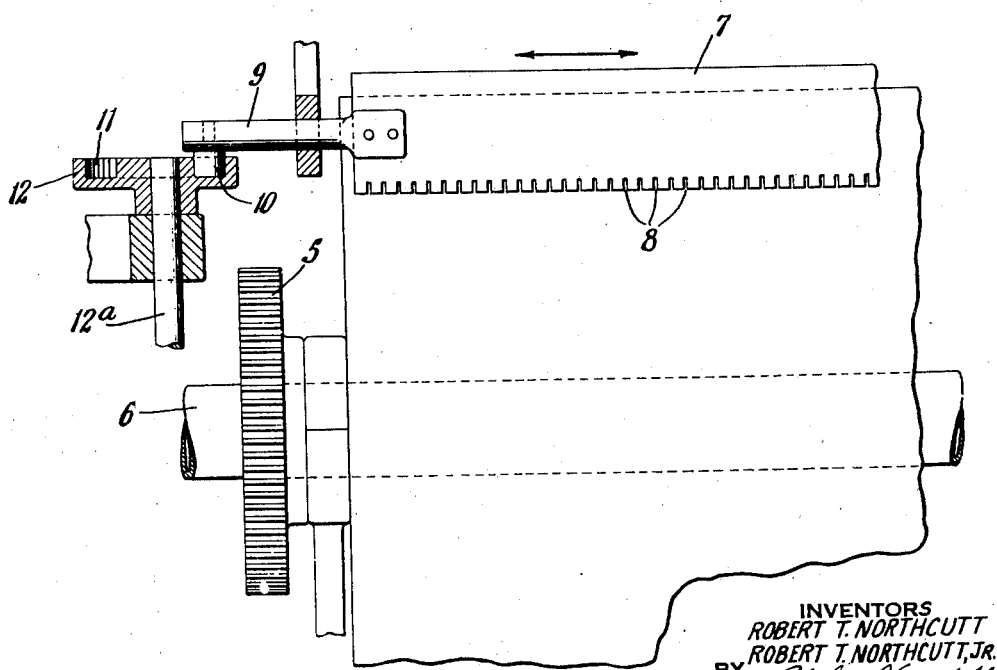
INVENTORS
ROBERT T. NORTHCUTT
ROBERT T. NORTHCUTT, JR.
BY
ATTORNEY Patented Feb. 10, 1948

2,435,842

UNITED STATES PATENT OFFICE 2,435,842

PREPARATION OF DRIED FRUIT PRODUCTS

Robert T. Northcutt, Westfield, and Robert T. Northcutt, Jr., Fanwood, N. J., assignors to Food Concentrates, Inc., New York, N. Y., a corporation of Delaware Application July 2, 1942, Serial No. 449,434

7 Claims. (Cl. 99—204)

This invention relates to the production of a dried fruit product and more particularly to an improved method for preparing a dried banana product capable of keeping for extended periods of time.

The drying of banana pulp presents a difficult problem because of the unique characteristics of the banana as compared with other fruits and vegetables. For example, a banana differs from other fruits in that all of its starch (about 20% of the banana) may be converted into sugar in a much shorter time than other fruits. Therefore, a banana may be ripened in five days as compared to a much longer time required for other fruits. The reason for this is that the enzyme activity in the banana is tremendous. Because of this great enzyme activity, any effort to maintain the temperature of bananas sufficiently high and for sufficiently long time to permit shelf drying will cause the banana to discolor and develop undesirable taste and odor, which makes it unsuited for sale as a food product.

It has previously been suggested to dry bananas by drum-drying a ground pulp of the banana. Drum-drying is well known for its simplicity of action, efficiency in heat exchange, economy of operation and rapidity of moisture removal. Efforts to use drum-drying, however, in the drying of banana pulp to produce a powder have met with difficulties because of inherent characteristics of both the fruit and the equipment. The fruit requires very low residual moisture to be suitable for powdering, but the drum will not produce this very low residual moisture without great difficulty in scraping the dried material from the drum, and the rate of production, even if possible, of such a fully dried product is extremely low per square foot of drum area. Also, minute variations of steam pressure, or other heating medium temperature, or even temperature or humidity changes in the atmosphere about the drums, will cause slight variations in the residual moisture of the material leaving the drum, and the sensitiveness of dried banana is such that even an extra fraction of a percent of moisture can and does detrimentally affect the powdering and keeping qualities of the product.

In the usual use of drum-drying for drying salts or solids there is a rapid and efficient removal of moisture to a very low residual moisture content. When ordinary slurries or solutions are dried on a drum, moisture removal continues at a satisfactory rate from the time of loading onto the drum until its removal by scraper knife. If extra heat on the drum surface is necessary, it may be applied without injury. Banana pulp shows a distinct difference, and while a rapid and efficient moisture removal occurs during the removal of the major portion of the moisture, the last ten or twelve per cent of moisture commences to resist removal and becomes more resistant as it approaches the limit of residual moisture permissible for powdering, which is two to three per cent as a maximum, and desirably not more than 1.8%. Any effort to supply heat in slight excess, in order to hasten the drying, quickly causes scorching and more troublesome sticking of material to the drum. Almost invariably both troubles are encountered simultaneously and the use of such excessive heat requires such frequent removal, sharpening and replacement of scraping knives as to render the operation impractical.

Drum-drying of banana pulp to partial dryness is the best of all forms of dehydration, until the moisture is reduced to a maximum of about twelve per cent residual moisture, and from that time on drum-drying becomes if not the worst, then one of the least desirable, most uneconomical, and physically difficult of operation, with end moisture content absolutely beyond control within required limits for commercial operation.

It is an object of the present invention to provide an improved procedure in which the banana, or other fruits containing substantial amounts of invert sugar with low melting point, may be dried to a greater extent and with greater uniformity than has heretofore been practicable. It is also an object to provide a process in which such drying may be effected without detrimental effect upon the color, taste and other desirable characteristics of the product. A further object is to provide a procedure for drying bananas wherein the enzyme action may be destroyed or largely inactivated and the product thereafter dried slowly, as by shelf drying. It is also an object to provide a multiple stage procedure in which the banana or other fruit pulp is partially dried and put into a form better adapted to resist packing or matting and subsequently drying such material by passing a current of air or other gas through it at elevated temperatures. Another object is to provide an improved apparatus for drying banana pulp. Other objects will become apparent.

We have found that by rapid dehydration of banana pulp on a drum to 30% or less residual moisture, discoloration and undesirable taste and flavor changes in the banana pulp during further dehydration of the pulp may be avoided. Therefore, the extremely rapid and economical removal of a large portion of the moisture may be performed on a drum and further dehydration to a predetermined point may be performed in a second drying system, such as shelf drying. In such a two-stage drying it is important that sufficient moisture be left in the pulp as it leaves the drum so that it does not adhere to the drying surfaces to the extent that the scraper knife is taxed. On the other hand, in the preferred operations, it is important that enough moisture is removed to give to the material sufficient consistency and strength to hold its shape as removed, so that it will not collapse when handled into the second drying system or during the heating and handling in the second drying system. Normally the drum output will be in the form of a thin, more or less continuous sheet. This sheet, if handled, collapses and forms intimate layers or compact conglomerates, which are not easily dried on trays or shelves. Therefore, one of the important features of our procedure in its preferred form is the forming of the material as it leaves the drum into shapes that will stand up and maintain a porous mass during the subsequent handling and heating operation.

In carrying out the present invention, the ripened banana is ground in a mill or otherwise comminuted to form a pulp of creamy consistency and is subjected to temperatures sufficiently high to destroy or largely inactivate the enzymes and to reduce the water concentration rapidly to less than 18% and preferably to about 10 to 12% or less. This heat treatment and drying may be accomplished on a drum drier and the material is preferably taken from the drum in such a manner as to leave it in relatively thick corrugated strips having sufficient rigidity to retain their shape and prevent packing during subsequent heating. This material may then be further dried without danger of enzyme action and, if the moisture is reduced to about 12% or less in the initial quick drying, so that the material is no longer a good culture medium, the subsequent drying may be carried on more slowly without danger of excessive bacterial growth. In this second drying step, the material may be dried in trays in an oven or room through which air or other suitable gas is circulated while maintaining the material at an elevated temperature, for example, of about 140 to 170° F. During the first stage of this shelf drying step, the temperature may, for instance, be maintained at about 160° F. for 2 to 3 hours, after which it may be lowered to around 140° F. The drying may be continued at the latter temperature until the moisture content is reduced to the desired extent, depending upon the use to which the material is to be put and the manner in which it is to be stored.

This ultimate moisture content is extremely important in its effect upon the keeping qualities of the product. The dried banana material is about 80% total sugars, ⅓ to ⅔ of which is levulose (invert sugar or fruit sugar) and the rest sucrose. The sucrose does not melt except at high temperatures but the invert-sugars present have a melting point of about 92° F. However, in the presence of the sucrose normally present in the banana, the melting point of the mixture is raised and, with a sufficiently low concentration of moisture, the product may be stored at temperatures of 95° F. or higher without becoming gummy and sticky. It is important, therefore, in the final stage of the drying to reduce the moisture content to less than about 1.8% in order for the product to keep and be handleable. Under normal conditions, the second drying is continued until this point is reached. If the drying is continued below this point it does no harm but is not usually necessary. It is also important to thoroughly mix the banana pulp before drying and to dry in such a way that the sugars will not crystallize out separately. Therefore, the quick drying to where the moisture will not give a syrupy effect is important. After that the drying may be conducted more slowly to remove more moisture.

The dried product may be used for some purposes in the form in which it is dried, i. e., in the form of corrugated strips. For other purposes it may be desirable to grind it to a powder which can be done, for example, by passing it through a coarse crusher and subsequently through a grinding mill, such as a hammer mill, in a dry atmosphere (not over 30% relative humidity) to reduce it to the desired particle size.

In carrying out the initial heating and drying step, an apparatus as illustrated in the drawings may be used. Figure 1 shows an end elevation of the drying apparatus with certain portions shown in section. Figure 2 is a similar but enlarged fractional side elevation with the conveyor removed to show the details of the doctor blade preferred for use in this apparatus.

The apparatus illustrated is an ordinary two drum drier having the horizontal drums 1, 1, each about 2 feet in diameter and 3 feet long and spaced apart to such an extent that the liquid pulp passing between them will form films that will dry on each drum. In order to obtain the maximum output on the drums it is desirable to maintain the film as thick as possible but thin enough that it will dry to the desired extent on the drum. For example, it would be desirable to use a film ¼ inch thick with proper drying conditions. However, in practical operations a somewhat thinner film has been found useful. For instance, in the apparatus illustrated, the drums may be spaced apart .005 to .02 of an inch and preferably about .005 to .006 of an inch.

Oppositely positioned end plates 2 are provided adjacent the ends of the rollers, and the banana pulp to be dried flows into the valley or trough, formed between these plates and the surfaces of the drums, through the pipe 3 having a plurality of nozzles 4. The drums are rotated in the directions indicated by arrows by any suitable means, such as through a variable speed transmission and chain sprockets or gears 5 fixed to the drum shafts 6, 6, on which the drums are supported in suitable bearings or by other suitable means. The speed of rotation of the drums should be variable and may be such, for example, as to make a complete revolution in about 5 to 20 seconds. Steam under gauge pressure of about 100 to 110 pounds per square inch is introduced into the inside of the drums through the drum shafts 6, 6, which are hollow and perforated, thus giving an inside drum temperatue of about 338 to 345° F. It is preferred in this drying step to use 100 pounds steam pressure, with the clearing between the drying rolls approximately .006 inch, and the drums revolving at a speed of from one revolution in six seconds to one revolution in seventeen seconds. This speed of rotation and resultant drying time should be regulated to changing conditions of the fruit being dried, atmospheric conditions, etc.

With the arrangement described and operating at the speed indicated, the films of material on the drums may be heated sufficiently to reduce its average moisture content to about 10 to 12%. The maximum temperature of the material on the drums should not be over about 215° F. and is preferably somewhat below that.

When the films of material have reached the desired degree of dryness, they are removed from the drum by means of the doctor blades 7, 7. These doctor blades are each provided with a plurality of notches 8, and about ⅛″ wide, ¼″ deep and ½″ apart, in the contacting or working edge of the blade. With this arrangement the partially dried film will be peeled off in the form of ribbons, leaving a narrow ridge of material on the drum. The doctor blades may be slowly reciprocated laterally with respect to the drum during each revolution so that the notches will be at different positions during succeeding rotations and the narrow ridges of material left during the preceding rotation will thereby be removed. The reciprocation of the doctor blades may be accomplished by any suitable means. For example, each doctor blade may have fixed to it a rod 9 carrying a cylindrical pin 10, positioned in the eccentric groove 11 in the rotating disc 12, on the shaft 12a. By slow rotation of the shaft 12a and the disc 12 fixed to it, the rod 9 and the doctor blade 7 will be caused to reciprocate. The rate of this rotation may be synchronized with the rate of rotation of the drum 1 to position the notches 8 at different places on succeeding rotations of the drum.

Continuous conveyors 13, 13, for example each made up of a belt travelling over a driven pulley 14 at one end and sliding over a rounded and polished bar 15 at the other end, may be positioned close to the doctor blades and operated so that the upper surfaces move away from the drums to carry the ribbons of material scraped from the drum. It is preferred to run the conveyors so that their surfaces move slower than the peripheral speeds of the drums 1, 1, so that the material deposited on the conveyors will take the form of corrugated or looped ribbons.

These corrugated ribbons are moist as they leave the doctor blades but dry quickly on the conveyor from residual heat, so that they will be dry to the touch on leaving the conveyor, although they may still contain about 10 to 15% moisture. If desired, these ribbons may be used as such, being of the nature of "dried fruits" of commerce. However, to improve their keeping and storing qualities, they should be further dried, for which purpose the ribbons leaving the conveyor, and preferably before they have cooled to room temperature, may be piled loosely in wire or other porous baskets 16, 16, so as to leave many interstices between the strips for circulation of drying air. When sufficiently filled, these baskets may be piled in stacks or on shelves in an oven or drying room and dried by the circulation of warmed air or other suitable gas. Such gas may be circulated so as to pass over the material being dried at a rate of about 1000 linear feet per minute. The rate of evaporation in this drier is more dependent on the speed of the air than the volume and is hastened by the wiping action of the fast moving air. If desired, a partial vacuum, with or without such a stream of inert gas, may be used to speed up this drying operation. This drying may be carried out at a constant temperature or at different temperatures as previously described, and may be continued until the moisture content of the dried banana product is reduced to the desired percentage, for example, to less than 1%.

As the ribbons are heated in the shelf drying operation, they will soften somewhat and the corrugations are important in giving them sufficient strength to resist packing or matting, so that the air or other drying medium may circulate freely through the material in the trays. This corrugation or looping of the ribbons by the reduced rate of speed of the carrier is something different from the crinkled effect that is inherent in the film of dried banana pulp when thin films are scraped from a drum drier, and serves to give the ribbons a structural rigidity and stability sufficient to avoid matting or packing because of its own weight during this subsequent shelf drying operation.

The dried ribbons may be ground to flour in a suitable mill in which a relatively dry atmosphere is maintained and may be packed in moisture proof containers.

It is obvious that many variations may be made in the procedure described. For example, other temperatures and rates of rotation may be used in the initial drying stage, it being important to have the temperatures high enough to kill or at least largely inactivate such enzymes and to effect such preliminary drying as is desired in that stage. By the use of any heat to quickly raise the pulp temperature to 180° F. or more (within half a minute), the enzymes which promote color changes are largely inactivated. If 220° F. temperature could be used the heat resistant catalase and oxidases would also be killed, but temperature of 220° F. is apt to produce heat changes in color (reddening of sugars and proteins) thus, a temperature below 220° F. and above 180° F. are employed. In the example described, about 212 to 215° F. will be the temperature actually found in the pulp at the end of the drum action. The important feature is to have the maximum temperature over 180° F. but not high enough above that point to produce heat color changes or scorching of the product. The rapid dehydration to 30% or less residual moisture will effectively prevent discoloration during any further dehydration of the pulp. It is preferred, however, to continue such heating until the moisture content of the material is sufficiently reduced that the material will not provide a suitable medium for bacterial growth during the subsequent shelf, tray or other drying operation.

Variations in the rates of rotation and temperature of the drum may, of course, be made with proper correlation of this rate and temperature. For instance, if the steam pressure is reduced to 5 pounds gauge pressure it would require a very long time to accomplish the drying, but the time could be reduced if the film on the drum were reduced in thickness. The same applies conversely to the use of steam at 200 pounds gauge pressure. It is preferred to operate so that the drying time in this stage is about 5 to 15 seconds with about a ten second average.

It is also obvious that other drying apparatus may be used for effecting either or both of the two stages of the drying operation, which two stages are important in obtaining a thoroughly standardized and superior product. The first stage of drying, by killing or inactivating the enzymes, reducing the moisture content of the pulp and putting the pulp in a suitable physical shape to maintain its form for the subsequent drying operation, makes possible the shelf drying of the material without deterioration of the product.

Although the corrugated or looped shapes have been described, it is obvious that the pulp may be formed into other suitable shapes and other means may be used for this purpose. For example, the material scraped from the drums may be allowed to roll up into spiral rolls, which may be removed and placed in trays or other containers so that the drying air may circulate freely through the rolls. Also, instead of removing the strips on a conveyor, they may be removed manually and be shaped and piled in tangled form in suitable containers to provide a porous mass through which the drying air can circulate readily. Or the material may be taken from the initial drier in gobs and put through an extruder, such as a macaroni press, to standardize the pulp and shape it into suitable shapes for the rapid circulation of air during the subsequent drying operation.

The final drying may be continued to reduce the moisture content to the desired extent, depending on the subsequent storing conditions. For example, if the product is to be packed and stored at not over about 80° F., reduction to about 2% moisture will suffice. However, if the product is to stand a storage temperature of 95° F. or over, the moisture content should be reduced to about 1% or less.

The procedures and apparatus described herein, although particularly suited for the drying of banana products because of the unusual problem involved in such drying, may also be used to advantage in the drying of other substances. For example, they may be used to advantage in the drying of other fruits which contain substantial amounts of invert sugar with a low melting point, such as apples, peaches, apricots, etc., or to other substances where similar problems are encountered. Obviously, in applying the procedures to other substances, some changes in the particular preferred temperatures, times, etc., may be desirable.

The terms used in describing the invention have been used in their descriptive sense and not as terms of limitation and it is intended to include within the scope of the invention all equivalents of the terms used. For example, in referring in the claims to drying by passing a gas through the material, it is intended to include vacuum drying, in which the moisture and gases liberated are drawn through the material, as well as the actual passage or forcing of air or other gas through the material.

We claim:

1. A method of making banana powder which comprises comminuting ripe bananas to produce a pulp of creamy consistency, flowing the pulp onto the exterior cylindrical surface of an internally heated rotating drum to form a thin film thereon, partially drying the pulp by heating the film while moving with the drum to a temperature between 180° F. and 220° F. for a sufficient time to inactivate enzymes present in the pulp and to reduce the moisture content of the pulp to below 18% but not below the point where the banana pulp becomes scorched, removing the partially dried film while still plastic from the rotating drum, forming the pulp into shapes which when piled are sufficiently rigid to provide numerous and extensive passages for gases, further drying the pulp by passing a current of heated air through a pile of the shapes in a chamber to reduce the moisture content to below 2% and thereafter pulverizing the pulp when its moisture content is less than 2%, to produce a banana powder.

2. A method of making banana powder which comprises comminuting ripe bananas to produce a pulp of creamy consistency, flowing the pulp onto the exterior cylindrical surface of an internally heated rotating drum to form a thin film thereon, heating the film while moving with the drum to a temperature between 180° F. and 220° F. for a time sufficient to reduce its moisture to the neighborhood of 10% to 18% thereby partially drying the product and inhibiting further enzymatic action, then scraping the partially dried film from the drum, and forming it into ribbons which will not collapse of their own weight when piled, thereafter further drying the partially dried ribbons of pulp by passing a current of air over and in contact with a pile of the ribbons of pulp until the moisture content of the pulp is reduced to below 2%, then pulverizing the product when its moisture content is below 2% to produce banana powder.

3. A method for making banana powder which comprises comminuting ripe bananas to produce a pulp of creamy consistency, flowing the pulp onto the exterior cylindrical surface of an internally heated rotating drum to form a thin film thereon, heating the film while moving with the drum to a temperature of between 180° F. and 220° F. for a time sufficient to reduce the moisture content of the banana film to below 30% whereby to partially dry the banana product and to inhibit further enzymatic action, then scraping the film from the drum before the product becomes scorched and forming it into narrow ribbons of sufficient rigidity that they will not collapse and mat under their own weight, while its moisture content is substantially above that at which the product can be pulverized into powder, then drying the partially dried pulp removed from the drum by passing a current of heated air over and through a pile of the ribbons while controlling the temperature and flow of air so that the temperature in the mass does not rise substantially above 140° F., continuing this drying until the pulp is uniformly dried to a moisture content below 2% and then pulverizing the product while its moisture content is less than 2%, to produce banana powder.

4. A method for preparing a dried banana product, comprising comminuting the banana to form a creamy pulp, subjecting films of the pulp about .002 to .01 inch thick to drum-drying on a drum internally heated to about 325° to 350° F. for about 5 to 15 seconds whereby to heat the pulp film to a temperature between 170° F. to 220° F. and thereby inactivating enzymes in the pulp and reduce the moisture content to below 18%, removing the film from the drum, forming it into corrugated ribbons, and further drying the pulp by passing a gas heated to a temperature between 130° F. and 170° F. through a pile of the corrugated ribbons in a chamber for a sufficient time to reduce the moisture content of the pulp to below 2% uniformly throughout and at a speed which does not permit sufficient softening of the pulp that the ribbons mat and form agglomerates whereby to render the pulp amenable to pulverizing to form a banana powder.

5. A method for preparing a dried banana product, comprising comminuting the banana to form a creamy pulp, subjecting films of the pulp about .002 to .006 inch thick to drum-drying on a drum internally heated to about 335° to 345° F. for about 12 to 14 seconds, whereby to reduce the moisture content of the pulp to below 18% without scorching, removing the film from the drum while the pulp is still plastic, forming it into corrugated ribbons, which will not form agglomerates by collapsing under their own weight and further drying the pulp by passing a gas through a pile of the corrugated ribbons at about 160° F. for 2 to 3 hours and thereafter at about 140° F. until the moisture content is less than 2% uniformly throughout the pulp whereby it is rendered amenable to pulverizing to form banana powder.

6. A method for drying bananas to produce banana powder, comprising comminuting the ripened bananas to produce a pulp of creamy consistency, flowing the pulp onto a drying drum heated by steam at pressures of about 100 to 110 pounds per square inch gauge pressure, scraping the partially dried film from the drying drum, after it has been on the drum for about 6 to 17 seconds, with a notched doctor blade to form ribbons on a travelling surface moving slower than the peripheral surface of the drum, thereafter heating the ribbons in open trays at temperatures of 140° to 170° F. in a current of air for sufficient time to reduce the moisture content to less than 1.8% and at a speed which does not permit melting of the pulp and thereafter pulverizing the so dried pulp when its moisture content is of that order.

7. A method of drying bananas to produce banana powder which comprises comminuting ripened bananas to form a pulp of creamy consistency, flowing the creamy pulp onto the exterior cylindrical surface of an internally heated rotating drum and forming thereon a thin film from .002 inch to .01 inch thick on said surface, heating the film to a temperature between 170° F. and 225° F. while the film is rotating with the drum, continuing the heating until the moisture content is less than 12% but for an insufficient time to scorch the pulp, removing the film from the drum while it is still plastic but of sufficient rigidity to be scraped off and formed into narrow ribbons which will prevent collapsing of the partially dried banana product and thereafter removing moisture from the partially dried ribbons of pulp by subjecting the ribbons in a chamber to the action of a moving stream of heated air while maintaining the pulp in the chamber at a temperature below 170° F. until the residual moisture content of the pulp is less than 1.8% whereby to produce a dried banana pulp which can be pulverized without caking in an atmosphere the relative humidity of which is less than 30%.

ROBERT T. NORTHCUTT.
ROBERT T. NORTHCUTT, Jr.

REFERENCES CITED

The following references are of record in the file of this patent:

UNITED STATES PATENTS

| Number | Name | Date |
|---|---|---|
| 757,706 | Wilson | Apr. 19, 1904 |
| 1,273,072 | Kuzmier | July 16, 1918 |
| 1,448,512 | Benjamin | Mar. 13, 1923 |
| 1,908,489 | Sartakoff | May 9, 1933 |
| 1,929,437 | McComb | Oct. 10, 1933 |
| 2,123,134 | Cowgill | July 5, 1938 |
| 2,259,606 | Beardslee et al. | May 9, 1933 |